Patented Mar. 22, 1932                                       1,850,594

UNITED STATES PATENT OFFICE

WINCENTY MATZKA, OF LONDON, ENGLAND

PROCESS FOR STERILIZATION OF LIQUIDS

No Drawing. Application filed September 4, 1926, Serial No. 133,693, and in Great Britain September 5, 1925.

It is a difficult problem to preserve fruit juices or the like without adding preservatives and without causing chemical and physiological changes which influence their value as foodstuffs in a negative direction. It is specially difficult to preserve packed fruit juices which are sold on a large scale and are submitted to variable temperatures.

The process discovered by Pasteur is very valuable and is probably the best which has been produced so far, but as many investigators have shown, pasteurized fruit juices are changed in a negative direction from the point of view of human nutriment both in their chemical and physiological constitution.

These negative results are mainly to be ascribed to the employment of high temperatures probably through destruction of the vitamines or deterioration of the proteins and aromatic esters.

To pasteurize products with the minimum injury, it is necessary to determine the necessary temperature of operation for each type of fruit juice and to reduce this temperature as far as possible by non-injurious prophylactic and/or physical means.

According to the present invention I bring the fruit juice or other liquid into simultaneous contact with a metal less electropositive than hydrogen and a metal more electropositive than hydrogen. The metals should show as wide a difference as possible in electro-positivity. Thus aluminium may be used on the one hand and gold or other noble metal on the other. Copper or sliver may be used as the more electro-positive metal and may be employed in conjunction with gold.

The two widely different metals may be in contact or spaced apart. They may be insulated from each other and an electrical potential may be applied to them. Thus the less electropositive metal may form the anode and the more electro-positive metal the cathode of a cell in which the applied E. M. F. may be for example 4 to 8 volts.

The liquid is preferably caused to flow between the two metals and is thus subjected to a sterilizing action. This action takes place even when there is no closed circuit and no application of outside electrical potential. It therefore appears to be of an oligodynamic nature. The fact that a noble metal such as gold gives the best results also indicates oligodynamic action. The action, whatever its nature may be, while not strong enough to effect decomposition, has a persistence effect so that there is always for a limited time after the liquid passes through the apparatus, a residual effect remaining in the liquid for a sufficient time to permit the liquid to be bottled even in the presence of air.

The liquid may be made to pass up an aluminium tube in which is situated a copper member extending across the tube and coated or tipped with gold.

An important feature of the invention resides in heating the metallic surfaces between which the liquid passes. A more effective utilization of the heat employed is obtained when it is applied in this way. The temperature employed depends upon the albumen content, the sugar content and the nature and amount of the esters present. The temperature is as high as can be employed without coagulating the albumen even minutely and without altering the sugars or breaking up the aromatic esters. In all cases the temperatures employed are below ordinary pasteurization temperatures.

The metals chosen for the metallic surfaces must have no chemical action on the liquid treated. Thus zinc and iron would be unsuitable as substitutes for aluminium in the treatment of fruit juices. Other metals may also be unsuitable in the case of certain liquids.

Other features of the invention will be apparent from the following description of a preferred form of my invention, and the appended claims.

It has been found that the treatment according to the present invention when applied to fruit juice causes destruction of microbes, moulds, spores, ferments and enzymes or makes them non-injurious so that the juice can be kept in sterile flasks without decomposition.

As in practice it will not normally be possible to avoid infection during the bottling of the product after this has been sterilized due to germs in the air or upon the bottles. It will be desirable to take the precaution of heating the sterilized juice when this has been corked up in the flask by immersing these in water heated to a temperature which can be somewhat below the usual pasteurization temperature due to the fact that the liquid has been previously subject to the aforementioned action between the metallic surfaces, whereby any bacteria or the like with which the juice or the like may have become infected in filling the flasks, from the atmosphere or from the surface of the flasks or storage vessels, may be destroyed.

The exact nature of the treatment will naturally vary with different fruits and with the nature of the infection.

*Example*

The fruit is first treated by prophylactic means e. g. by a liquid which can be readily washed out with water. Thus the fruit may be immersed and agitated in 2% sulphur dioxide solution or a solution of hydrogen peroxide or formaldehyde etc. or may be merely moistened by spraying with water in suitable conveying mechanism, or it may be exposed in counter-current or otherwise to a disinfectant gas or exposed to the action of such a gas in a closed chamber; the fruit is then washed with cold water rendered sterile by boiling and treated for producing juice in known manner.

The juice is collected in a closed vessel with the exclusion of air and supplied through a pipe to the apparatus under its own pressure.

A suitable form of apparatus is described in my copending application Serial No. 133,692, filed September 4th 1926, and entitled "Apparatus for the sterilization of liquids".

It is desirable that the metallic surfaces be heated during the process. This may be effected by arranging them on hollow bodies through which hot water or steam are passed.

The temperature of the metallic surfaces is chosen according to the liquid treated, for instance the higher the albumen content of the liquid where this contains albumen, the lower the temperature, and again in the case of a fruit juice the higher the acidity, the lower the temperature, it being always desirable to work with as high a temperature as possible without affecting the characteristics of the fruit juice or the like liquid, that is to say that a too high temperature tends to coagulate albumen if present and cloud the product and again to convert the sugar of the fruit juice and heat the esters destroying the natural aroma it is particularly desired to retain.

When treating unfiltered fruit juice containing pulp, it may be desirable in certain cases to finish the process by a short pasteurization which however may be performed at a lower temperature than usual for the same reason as set forth above, namely that the juice has already been subject to the action between the metallic surfaces.

By the process of this invention a rapid and efficient sterilization can be effected since, owing to the greater effect of the heat when combined with the action between the metallic surfaces, sterilization is effected below normal pasteurization temperatures and consequently the important further advantage is obtained that the natural aroma of the juice or liquid can be retained during and after sterilization.

When the fruit requires pulping e. g. in the case of oranges, lemons, grape fruit and the like, the machine used must not make a colloidal pulp or this will give rise to a musty taste.

The invention is not limited to the sterilization of fruit juice since the process may be applied to the treatment of other materials particularly edible materials such as milk, meat extract, and the like.

I declare that what I claim is:—

1. The process of sterilizing food liquids which comprises subjecting the food liquids to the action which occurs between two metallic surfaces arranged with a narrow space between them, one surface having a higher electro-potential than hydrogen, the other having a lower electro-potential than hydrogen, and both being chemically inert to the food liquids, then bottling the liquid and finally heating the liquid after the bottle is sealed to a temperature below the specific pasteurization temperature of the food liquid, to resterilize the food liquid in case of air infection during filling, by the combined action under seal of the heat and the residual effect of the action between the metallic surfaces.

2. The process of sterilizing food liquids which comprises subjecting the food liquid while at a raised temperature below normal pasteurizing temperature to the action which occurs between two metallic surfaces arranged with a narrow space between them in simultaneous contact with said liquid, one surface having a higher electro-potential than hydrogen, the other having a lower electro-potential than hydrogen and both being chemically inert to the food liquids.

3. The process of sterilizing food liquids which comprises subjecting the food liquid while at a raised temperature below normal pasteurizing temperature to the action which occurs between two metallic surfaces arranged with a narrow space between them in simultaneous contact with said liquid, one surface having a higher electro-potential than hydrogen, the other being composed of aluminium and both being chemically inert to the food liquids.

4. The process of sterilizing food liquids which comprises subjecting the food liquid while at a raised temperature below normal pasteurizing temperature to the action which occurs between a surface of gold and a surface of aluminium in simultaneous contact with said liquid and with a narrow space between them.

5. The process as claimed in claim 2 in which one of said electrodes is moderately heated.

In witness whereof, I have hereunto signed my name this 30th day of July 1926.

W. MATZKA.